United States Patent [19]

Nanya

[11] 3,893,086

[45] July 1, 1975

[54] ASYNCHRONOUS SPATIAL SHIFT REGISTER CIRCUIT

[75] Inventor: Takashi Nanya, Tokyo, Japan

[73] Assignee: Nippon Electric Company, Limited, Tokyo, Japan

[22] Filed: Dec. 11, 1973

[21] Appl. No.: 423,823

[30] Foreign Application Priority Data

Dec. 13, 1972 Japan .............................. 47-125432

[52] U.S. Cl............ 340/173 R; 307/221 R; 328/37; 340/173 FF

[51] Int. Cl............................................. G11c 19/00

[58] Field of Search.... 340/173 R, 173 FF, 173 RC, 340/172.5, 174 SR; 307/221 R; 328/122, 37, 42

[56] References Cited

UNITED STATES PATENTS

| | | | |
|---|---|---|---|
| 3,665,424 | 5/1972 | Scharkowitz | 340/173 R |
| 3,736,570 | 5/1973 | Hendrickson | 340/173 R |

OTHER PUBLICATIONS

Fugere et al., Three-State Storage Cell, IBM Technical Disclosure Bulletin, Vol. 14, No. 6, 11/71, p. 1694, 340/173 FF.

*Primary Examiner*—Stuart N. Hecker
*Attorney, Agent, or Firm*—Sughrue, Rothwell, Mion, Zinn & Macpeak

[57] ABSTRACT

An asynchronous multi-stable state circuit particularly adapted for use in a shift register. The bits move through the stages asynchronously. Each stage is capable of storing a 1, 0 or $\phi$ bit and has three control states; quiescent, set and clear. When a given stage is in the quiescent state a clear signal from a succeeding stage will cause the given stage to store or register a bit $\phi$ therein. This effectively puts the stage in a waiting condition. When this occurs, the control state switches from quiescent to set. When in the set state, the data 0 or 1 from the preceding stage is entered into the given stage for storage therein. Next, the given stage switches to the clear state and sends a clear signal to put the preceding stage in the waiting condition, i.e., storage of $\phi$. When the preceding stage stores a bit $\phi$, it sends a signal back to the given stage to switch the given stage to the quiescent state.

7 Claims, 5 Drawing Figures

FIG. 4

| | 1 | 2 | 3 | 4 | 5 | 6 | 7 |
|---|---|---|---|---|---|---|---|
| M1 | $L_1$ | $L_1$ | $L_1$ | $L_1$ | $L_1$ | $L_ø$ | $L_ø$ |
| K1 | Q | Q | Q | Q | Q | Q | S |
| M2 | $L_0$ | $L_ø$ | $L_ø$ | $L_1$ | $L_1$ | $L_1$ | $L_1$ |
| K2 | Q | Q | S | S | C | C | Q |

→

| | | a | b | c | d | e | f | |
|---|---|---|---|---|---|---|---|---|
| (1) | | ø | ø | 1 | 1 | 0 | 1 | |
| (2) | | ø | ø | 1 | 1 | 0 | ø | → "1" |
| (3) | | ø | ø | 1 | 1 | ø | 0 | |
| (4) | | ø | ø | 1 | ø | 1 | 0 | |
| (5) | "1" → | ø | ø | ø | 1 | 1 | 0 | |
| (6) | | 1 | ø | ø | 1 | 1 | 0 | |
| (7) | | ø | 1 | ø | 1 | 1 | 0 | |
| (8) | | ø | ø | 1 | 1 | 1 | 0 | |

FIG. 5

ASYNCHRONOUS SPATIAL SHIFT REGISTER CIRCUIT

BACKGROUND OF THE INVENTION

The present invention relates to an asynchronous spatial iterative circuit capable of asynchronously controlling the state transition in a threestate memory circuit and thus performing data transfer, data memory and similar operations in parallel form and asynchronously. Additionally, the present invention relates to a shift register comprising a plurality of asynchronous spatial iterative circuits connected in series.

A shift register having functions of storing and transferring logic data is an important and basic constituent in the field of information handling system such as electronic computers. A conventional shift register functions to store data written in parallel or series and to shift the date, bit-by-bit, in response to a clock pulse. An example of such a register is described in an article published in "IEEE TRANSACTIONS ON COMPUTERS," September issue, 1970, VOL. C-19, No. 9, FIG. 2 on page 803. In the type of shift register described, the stored data is shifted by one unit position in response to each clock pulse. In order to shift the data position by a given distance, it is necessary to use as many clock pulses as there are unit positions, corresponding to said given distance. As a result the data transfer speed is limited by the clock pulse width and cycle, causing difficulties in achieving higher data processing speed.

Another example of the prior art shift register is described in a paper published in "COMPUTER DESIGN," VOL. 12, NO. 6, FIG. 1 on page 84 (June, 1973). Similarly, as this shift register also uses clock pulses to perform write and read operations and data transfer in sequence, this register is suited neither for high speed data processing nor for data transfer between a plurality of data processors which operate independently of one another.

The object of the present invention is therefore to provide an asynchronous spatial iterative circuit free from the above-mentioned disadvantages of the prior art shift register suited for used as a constituent of a shift register capable of asynchronously processing data transfer and data memory operations.

SUMMARY OF THE INVENTION

Briefly, the asynchronous spatial iterative circuit of this invention comprises: a three-state memory circuit having three stable internal states and capable of controlling the transition from one stable state to another and discriminating the three states from one another; a logic gate circuit for gating inputs supplied to input terminals thereof from an external circuit for designating transitions from one stable state to a first stable state and a second stable state of the memory circuit; and a control circuit having functions of 1. bringing the gate circuit into conducting state when the memory circuit has finished its transition from one stable state to a third stable state, 2. bringing the gate circuit into nonconducting state when the memory circuit has completed its transition from one stable state to the first or second stable state, 3. indicating the completion of the control operation 2, and 4. invalidating the signal of an output terminal by a response signal from an input terminal. Thus, one bit of data in terms of logic 1 and 0 corresponding to the first and second stable states is written, stored and transferred through output terminals provided to represent the first, second and third stable states, respectively.

BRIEF DESCRIPTION OF THE DRAWINGS

The present invention will now be described more in detail in conjunction with the accompanying drawings, in which;

FIGS. 4 and 5 show tables for illustrating the operation of the shift register shown in FIG. 3.

DETAILED DESCRIPTION OF THE PREFERRED EMBODIMENTS

Figure 1:
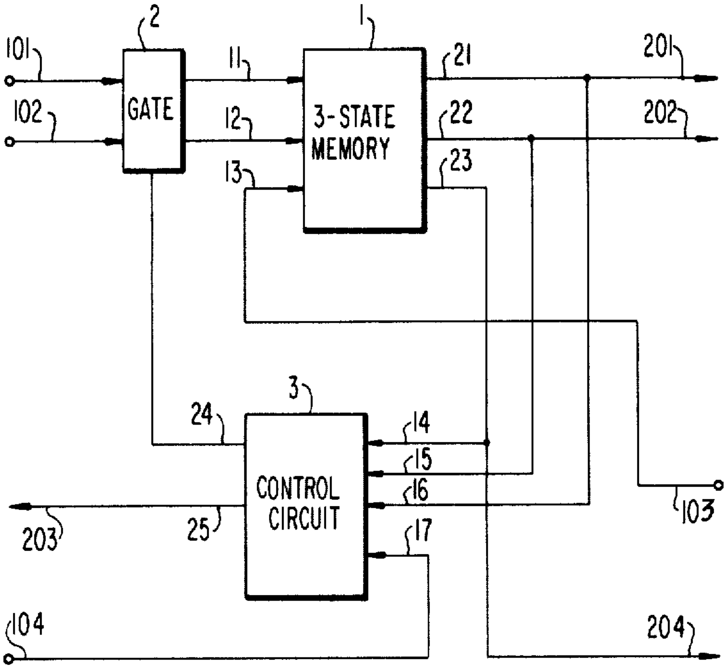
FIG. 1 shows a block diagram of the invention.

In FIG. 1, the present asynchronous spatial iterative circuit comprises a three-state memory circuit 1, a logic gate circuit 2, a control circuit 3, and four input terminals 101, 102, 103 and 104, and four output terminals 201, 202, 203 and 204.

For convenience of explanation, the two signal values of any binary signal are defined in terms of logic 1 and 0. In FIG. 1, the internal states of the three-state memory circuit 1 can be shown by a set of signal values of output lines 21, 22 and 23. More specifically, first, second and third stable internal states $L_1$, $L_0$ and $L_\phi$ of the memory circuit 1 are indicated as (0, 1, 1), (1, 0, 1) and (1, 1, 0), respectively. The first and second stable states $L_1$ and $L_0$ correspond to logic values 1 and 0, respectively, of data to be stored or transferred. The third stable state $L_\phi$ corresponds to the third logic value $\phi$ which neither 1 nor 0.

The memory circuit 1 has input lines 11, 12 and 13 corresponding to the stable states $L_1$, $L_0$ and $L_\phi$, respectively. The input states may be represented by a set of signal values of the input lines 11, 12 and 13. When the input state is (0, 1, 1), the internal state changes into $L_1 = (0, 1, 1)$. Under the input state (1, 0, 1), the internal state is transferred to $L_0 = (1, 0, 1)$. In a case where the input state is (1, 1, 0), the internal state becomes $L_\phi = (1, 1, 0)$. However, if the input state is (1, 1, 1), the existing internal state remains unchanged. In a case where the signal values of two or more input lines are 0, i.e., where the input state is any one of (0, 0, 0), (0, 0, 1), (0, 1, 0) and (1, 0, 0), the signal values of the output lines 21, 22 and 23 become all 1, which indicates that the internal state is not any one of $L_1$, $L_0$, $L_\phi$.

The logic gate circuit 2 functions to turn on or off the signals from the input terminals 101 and 102 to the input lines 11 and 12 of the memory circuit 1. Under the state in which the gate of the circuit 2 is closed, the signals on the lines 11 and 12 are kept in the value 1. While its gate is opened, and simultaneously, a signal appears in the input terminal 101 or 102, the signal value of the corresponding line 11 or 12 is brought into 0.

The control circuit 3 controls the transistion of the internal states of the circuit 1 and has three stable internal states. Each internal state is expressed by a pair of signal values of two output lines 24 and 25 in this order. More definitely, first, second and third stable states Q, S and C of the circuit 3 are represented by (1, 1), (0, 1) and (1, 0), respectively.

Figure 2:
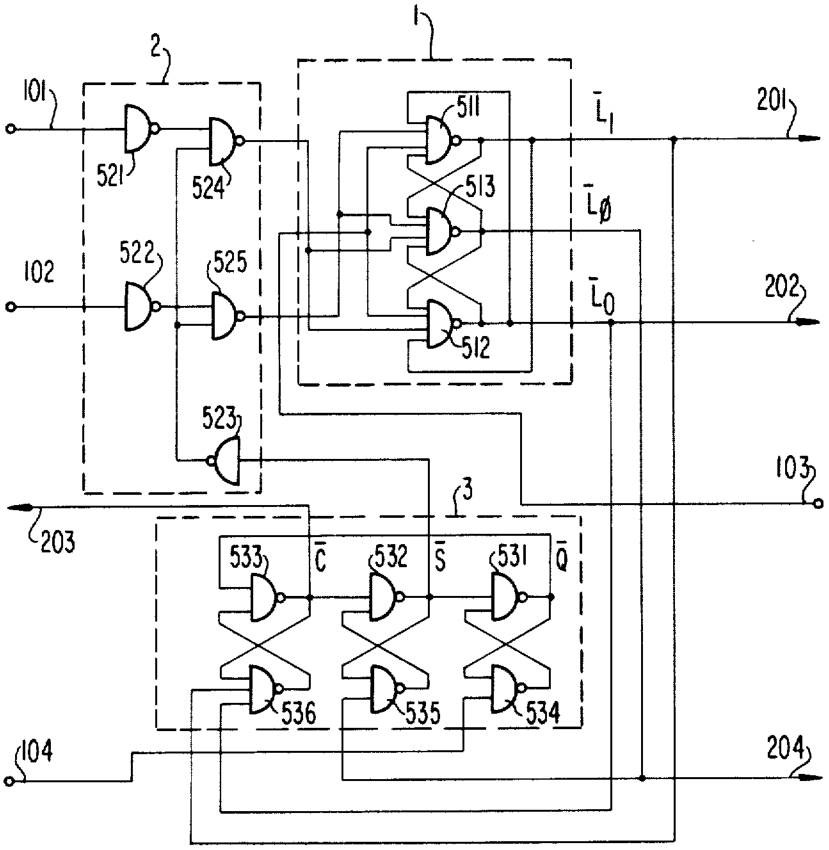
FIG. 2 shows a diagram of one embodiment of the invention.

In FIG. 2, for simplicity of explanation, it is assumed that the logic elements used herein are uniformly NAND elements.

More particularly, the area encircled with the broken line as indicated by numeral 1 represents the three-state memory circuit of FIG. 1. Similarly, the area 2 stands for the logic gate circuit, and the area 3 for the control circuit, respectively. Also, the memory circuit 1 is composed of three 4-input NAND logic elements 511, 512 and 513. The gate circuit 2 comprises three 1-input NAND logic elements (or inverters) 521, 522 and 523, and two 2-input NAND logic elements 524 and 525. The control circuit 3 includes five 2-input NAND logic elements 531, 532, 533, 534 and 535, and one 3-input NAND logic element 536. The logic operation of a NAND element is well known. Briefly, the output is a logic 1 for all combinations of logic inputs except for the one combination consisting of all inputs at logic 1. In the latter case the output is a logic 0.

The internal states of the circuit 1 are indicated by the set of signal values at the outputs of NAND logic elements 511, 512 and 513. The first, second and third stable internal states $L_1$, $L_0$ and $L\phi$ are represented by the logic combinations (0, 1, 1), (1, 0, 1) and (1, 1, 0), respectively, at gates 511, 512 and 513. Because the output of a NAND element is 1 whenever at least one input is 0, the cross coupling of the outputs of the three NAND elements 511, 512 and 513 as illustrated in FIG. 2, prevents more than one output from being at logic 0 simultaneously. Therefore, the logic condition where the output of the element 511 is 0 corresponds to the state $L_1$, that condition where the element 512 is 0 corresponds to the state $L_0$, and that condition where the element 513 is 0 corresponds to the state $L\phi$. In other words, this means that the signal values appearing at the output terminals 201, 202 and 204 never become 0, simultaneously. In addition, when the output terminal 201 stands at 0, the circuit 1 informs an external circuit through the line 201 a fact that the logic value 1 of data corresponding to the state $L_1$ is stored therein. While if the output terminal 202 is 0, an information indicating that the logic value 0 of data corresponding to the state $L_0$ of the circuit 1 is stored therein is sent to the external circuit. Moreover, under the state of both signal values 1 appearing at the output terminals 201 and 202, this shows that the logic value $\phi$ of data is stored in the circuit 1.

In the gate circuit 2, which controls the operation of turning on or off the signals supplied from the input terminals 101 and 102, when the output of the element 523 is 0 the gate of the circuit 2 is closed. When the output of the element 523 becomes 1, thereby opening the gate of circuit 2, the output of elements 524 or 525 correspond, respectively, to the inputs at terminals 101 and 102.

Assuming the input 103 is at a logic 1, and the input at 101 and 102 becomes (0, 1), the circuit 1 assumes the logic state $L_1$. This can be seen by following the logic signals through the circuit. The logic 0 at 101 causes a logic 0 at the output of gate 524. Thus, logic 0's are applied to gates 513 and 512 causing those outputs to become logic 1's. The latter logic 1's along with a logic 1 from input 103 and a logic 1 from gate 525 causes gate 511 to have a logic 0 output. The outputs of gates 511, 512, 513 therefore correspond to (0, 1, 1) which represents stable state $L_1$.

By the same analysis the input combination (1, 0) at 101, 102 cuases the circuit to assume the stable state $L_0$. However, if the gate of the circuit 2 is closed, the outputs of the elements 524 and 525 are both 1. Under this state, the internal state of the circuit 1 is kept unchanged as long as the signal value at the input terminal 103 is 1.

As is apparent from the foregoing, the condition that the signal value appearing at the input terminal 101 is 0 means that data of logic value 0 is ready to be written from the external circuit. On the other hand, when the signal value appearing at the input terminal 102 is 0, this corresponds to the operation that data of logic value 1 is ready to be written from the external circuit. In this case, it is essential that an external signal from the external circuit should be supplied so that the signal values occurring at the terminals 101 and 102 may not become 0, at the same time. In a case where the signal values appearing at the terminals 101 and 102 are both 1, this corresponds to the operation that data of logic value $\phi$ is externally supplied thereto. Under this condition, the outputs of the elements 524 and 525 are both 1 even if the gate of the circuit 2 is opened, since the outputs of the NAND elements 521 and 522 are both 0. Therefore, the outputs of the NAND elements 524 and 525 are both held at 1. For this reason, no state transition occurs in the memory circuit 1. The elements 521 and 522 are inverters used to conform signal polarities to each other at the input terminals 101 and 102 versus the output terminals 201 and 202, respectively. This is because of the matching between these input and output terminals in a shift register comprising a plurality of asynchronous spatial iterative circuits disposed in series.

The control circuit 3 is constituted by an asynchronous sequential circuit having three stable internal states, which are expressed by a set of the output signal values of the elements 531, 532 and 533, arranged in this order, and the first, second and third stable internal states Q, S and C are given in terms of (0, 1, 1), (1, 0, 1) and (1, 1, 0), respectively. The state Q is a quiet state. The state S is a set state wherein the logic value 1 or 0 of data supplied from the input terminal 101 or 102 is set into the circuit 1. The state C is a clear state wherein the logic value of data stored in the previous stage is changed to $\phi$ when the data writing operation into the circuit 1 has completed. Moreover, when the control circuit 3 is initially in the internal state Q represented by (0, 1, 1) the control circuit 3 operates as follows. (1) As soon as the internal state of the memory circuit 1 changes into the state $L\phi$ in which the outputs of the NAND elements 511, 512 and 513 are 1, 1 and 0, respectively, the output of the element 535 in the control circuit 3 becomes 1, and then, the output of the element 532 becomes 0. As a result, the output of the element 531 becomes 1. These signal changes make the state transition from the state Q to the state S. (2) Immediately after the internal state of the memory circuit 1 changes into the state $L_0$ or the state $L_1$, the output of the element 536 in the control circuit 3 becomes 1, and then, the output of the element 533 becomes 0. Therefore, the output of the element 532 becomes 1. These signal changes make the state transition from the state S to the state C. (3) Instantly when the signal value appearing at the input terminal 104, which is normally 1, becomes 0, the output of the element 534 becomes 1, and then, the output of the element 531 becomes 0. Consequently, the output of the element 533 becomes 1. These signal changes result in the state transition from the state C to the state Q, which is the initial state of the control circuit 3. The stable states required for the control signals are S and C, which occur when the signal values of the outputs of elements 532 and 533 are 0, respectively, and three internal states Q, S and C can be represented by given pairs (1, 1), (0, 1) and (1, 0), respectively, which are the output values of the elements 532 and 533 arranged in this order. For this reason, two output lines derived from the elements 532 and 533, respectively, can be sufficiently utilized for the control operations.

In summary, the control circuit states change in the following sequence; Q, S, C, Q, S, C, . . . . It switches from state Q to state S when the state of the memory 1 becomes $L\phi$. It switches from state S to state C when the state of the memory 1 becomes either $L_0$ or $L_1$. It switches from state C back to state Q when line 104 becomes a logic 0. As will be seen later, the latter condition corresponds to the memory of a prior stage becoming $L\phi$.

Figure 3:
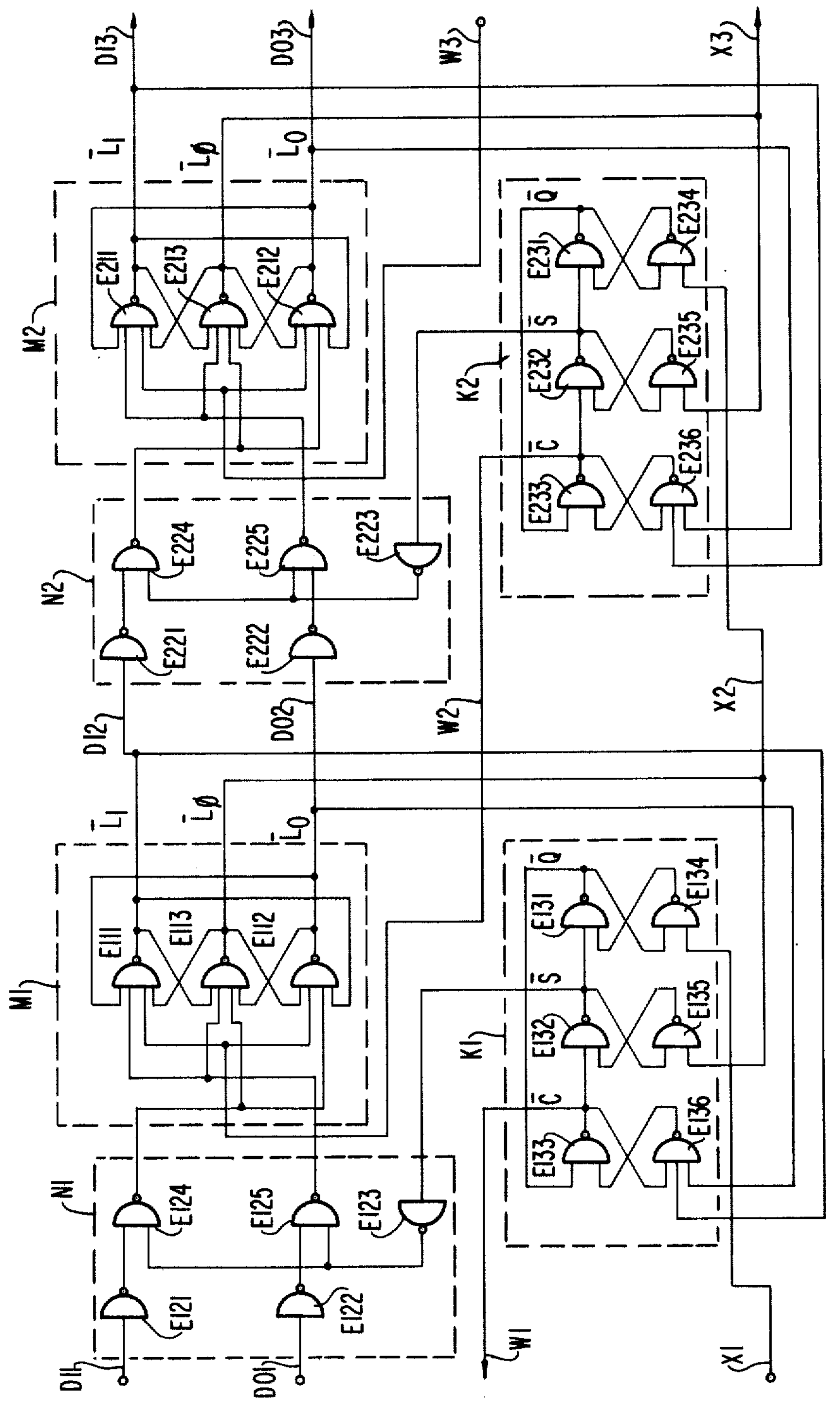
FIG. 3 shows a diagram of a shift register based on the present invention.

The invention will be described in greater detail by an exemplification of a shift register comprising two identical asynchronous spatial iterative circuits connected in cascade as shown in FIG. 3.

In FIG. 3, the shift register is formed by two asynchronous spatial iterative circuits of the type as shown in FIG. 2. The circuits indicated by symbols M1 and M2 correspond to the memory circuit 1 of FIG. 2, the circuits indicated by symbols N1 and N2 correspond to the gate circuit 2 of FIG. 2, and the circuits indicated by K1 and K2 correspond to the control circuit 3 of FIG. 2. The internal states of the three-state memory circuit M1 are indicated by a three-term set of output signal values of elements E111, E112 and E113, in this order. Similarly, the internal states of the three-state memory circuit M2 are represented by a three-term set of output signal values of elements E211, E212 and E213, in this order. The internal states of the control circuits K1 and K2 are expressed by a three-term set of output signal values of elements E131, E132 and E133, and by a three-term set of output signal values of elements E231, E232 and E233, respectively.

FIG. 4 shows a table for explaining the transistions of states in the memory circuits M1 and M2 and control circuits K1 and K2 as shown in FIG. 3. In the table, numerals 1, 2, . . . . and 7 indicate the lapse of time, and M1, K1, M2 and K2 denote the internal states of the memory circuit M1, the control circuit K1, the memory circuit M2, and the control circuit K2, respectively. The individual initial states are indicated in the column shown by the numeral 1 where the internal states corresponding to M1, K1, M2 and K2 are $L_1$, Q, $L_0$ and Q, respectively. The sequence represented by the time sequences 2 to 7 of FIG. 4 indicate the state transitions in the respective circuits of the shift register as the data (1, 0) in memories M1 and M2, respectively, is shifted by a signal at W3 to become date ($\phi$, 1) in memories M1 and M2, respectively. In FIG. 3, it is assumed that as the initial state of the shift register, the internal states of the memory circuits M1 and M2 are $L_1$ and $L_0$, respectively, and the internal states of the control circuits K1 and K2 are both Q. In this condition, the entire shift register remains stable as long as the signal value appearing at the input terminal W3 is 1 (the stage shown at time point 1 of FIG. 4).

Assuming here that the signal value appearing at the input terminal W3 changes into 0, the internal state of the circuit M2 makes a transition to the stable stage $L\phi$, where the output of E213 becomes 0 (the stage shown at time point 2 of FIG. 4). The circuit K2 changes its internal state from Q to S at the moment the circuit M2 has finished its state transition from $L_0$ to $L\phi$ (the stage shown at time point 3 of FIG. 4). As a result, the gate circuit N2 comprising elements E224 and E225, is brought into the conducting state through element E223. Since, under this condition, the internal state of the circuit M1 is $L_1$ = (0, 1, 1), the element E224 changes its output signal value from 1 to 0 to cause the memory circuit M2 to change its state from $L\phi$ to $L_1$ (the stage at time point 4 of FIG. 4). This means that data of logic value 1 stored in the circuit M1 is written into the other circuit M2. After this operation, the control circuit K2 changes its state from state S to state C to cause the gate circuit N2 to be closed (the stage at time point 5 of FIG. 4). At the same time, the circuit K2 causes the signal value appearing at an output terminal W2 to change from 1 to 0 and thereby causing the state of the circuit M1 to vary from $L_1$ to $L\phi$ (the stage at time point 6 of FIG. 4). Under this state transition, in a case where the signal value appearing at the element E113 turns into 0, the control circuit K2 is restored to the state Q from state C, while the control circuit K1 makes the state transition from state Q to state S (the stage at time point 7 of FIG. 4). The circuit M1 and the circuit K1 operate in the same manner as the foregoing circuits M2 and K2 and make state transitions in the same sequence.

Thus, as seen from the above described operation, the data in M2 is shifted out, the data in M1 is shifted into M2, and the memory M1 is ready to receive the data at inputs D11, D01.

FIG. 5 shows a diagram for illustrating how data are shifted in a shift register comprising six asynchronous spatial iterative circuits (FIG. 2 and FIG. 3) in cascade wherein data 1, 1, 0 and 1 are stored. The logic values of data stored and transferred in the shift register are 1, 0 and $\phi$ corresponding to the stable states $L_1$, $L_0$ and $L\phi$, respectively. In FIG. 5, the numerals (1) through (8) indicate the lapse of time, and the rows indicated by these numerals correspond to each stage of the shift register. The arrow mark at the upper portion indicates the data shift direction. The symbols *a*, *b*, *c*, *d*, *e*, and *f* denote the asynchronous spatial iterative circuits of the type as shown in FIG. 2 and FIG. 3. The circuit *f* has input and output terminals corresponding to the input and output terminals D13, D03, W3 and X3 as shown in FIG. 3. Also, the circuit *a* has input and output terminals corresponding to the input and output terminals D11, D01, W1 and X1 as shown in FIG. 3. Since the sequential behavior of each iterative circuit in the shift register is the same as that previously explained a detailed explanation of the shift operation of the shift register whose data transfer mode is illustrated in FIG. 5 is omitted. It should be noted in connection with steps 5 through 8, that a stage in state $\phi$ is always ready to receive data.

In the foregoing embodiment, the initial state can be set in terms of logic value 1 or 0 held in the memory circuit 1 by turning the output of the element 524 or 525 (FIG. 2) into 0 from the external circuit.

Also, in the foregoing, it is assumed that the signal levels are 1 and 0, and NAND elements are used for each circuit. Instead, other logic elements and circuits may be used at a suitable signal level such as 1 or 0.

As has been described above, the invention provides an asynchronous spatial iterative circuit highly useful for use as an essential element to constitute a shift register capable of asynchronously processing signals with high efficiency. Hence, the present circuit has a broad range of applications to buffer equipment in the interface between data processors operating out of synchronism. In addition, the circuit of the invention permits very high speed data processing since it can be designed without taking into consideration the delay time. For example, with the present asynchronous spatial iterative circuit, it becomes easily possible to reaize the FIFO buffer register, as described in the above-mentioned literature "COMPUTER DESIGN," VOL. 12, No. 6, pages 84 to 88, for asynchronously transferring the data.

It would be apparent, however, that a number of alternatives and modifications can be made within the scope of the present invention defined by the appended claims.

What is claimed is:

1. An asynchronous spatial iterative circuit, having a first, second, third and fourth input terminals and a first, second, third and fourth output terminals comprising: a three-state memory circuit having three stable internal states and capable of transition from one stable state to another; a logic gate circuit for gating inputs supplied to the first and second input terminals and designating transitions to a first stable state or a second stable state in the memory circuit; and a control circuit means responsive to the internal state of the memory for (1) rendering the gate circuit into conducting state when the memory circuit has finished its transition from the first or second stable state to a third stable state as a result of an input being given to the third input terminal, (2) rendering the gate circuit into nonconducting state when the memory circuit has completed its transition from the third stable state to the first or second stable state, (3) generating a signal indicative of the completion of the control operation (2) at the first output terminal, and (4) invalidating the output signal at the first terminal upon receipt of a response signal at the fourth input terminal; wherein one bit of data in terms of logic 1 and 0 corresponding to the first and second stable states is written, stored and transferred through the second, third and fourth output terminals used to represent in combination the first, second and third stable states.

2. A shift register comprising a plurality of identical asynchronous spatial iterative circuits each having first to fourth input terminals and first to fourth output terminals and comprising: a three-state memory circuit having three stable internal states and capable of transition from one stable state to another; a logic gate circuit for gating inputs supplied to the first and second input terminals and designating transitions to a first stable state or a second stable state in the memory circuit; and a control circuit means responsive to the internal state of the memory for (1) rendering the gate circuit into conducting state when the memory circuit has finished its transition from the first or second stable state to a third stable state as a result of an input being given to the third input teminal, (2) rendering the gate circuit into nonconducting state when the memory circuit has completed its transition from the third stable state to the first or second stable state, (3) generating a signal indicative of the completion of the control operation (2) at the first output terminal, and (4) invalidating the output signal at the first output terminal upon receipt of a response signal at the fourth input terminal; wherein one bit of data in terms of logic 1 and 0 corresponding to the first and second stable states is written, stored and transferred through the second, third and fourth output terminals used to represent in combination the first, second and third stable states and wherein the first to fourth input terminals, and the first to fourth output terminals have such signal polarities as to allow the second, third and fourth output terminals and the third input terminal of one of the iterative circuits to be connected to the first, second and fourth input terminals and the first output terminal, respectively, of the following iterative circuit.

3. A circuit having three stable states, $L_1$, $L_0$ and $L_\phi$ and adapted to assume the stable state indicated by an input signal, said circuit comprising:

a. first means responsive to a first externally applied input signal when said circuit is in a quiescent condition for causing said circuit to assume said stable state $L_\phi$, b. second means responsive to said circuit assuming said stable state $L_\phi$ for switching said circuit to the set condition, c. third means, operative when said circuit is in said set condition, for causing said circuit to assume a stable state $L_1$ or $L_0$ corresponding to said input signal, and d. fourth means responsive to said circuit assuming a stable state $L_1$ or $L_0$ for switching said circuit out of said set condition.

4. A circuit as claimed in claim 3 wherein said first and third means in combination comprises:

a. a gating circuit means responsive to input signals representing $L_1$ and $L_0$ and to an enabling signal for providing output signals corresponding to said input signals when said enabling signal is present and for providing an output signal corresponding to $L_\phi$ when said enabling signal is not present, and b. a three state logic circuit having inputs connected to the output of said gating circuit means and a further input connected to receive said externally applied signal, said three state logic circuit being responsive to an input signal corresponding to $L_\phi$ and to said externally applied signal for assuming a stable state corresponding to $L_\phi$; said three state logic circuit being responsive to the absence of said externally applied signal and to the presence of an input signal corresponding to $L_1$ or $L_0$ for assuming a stable state $L_1$ or $L_0$, respectively.

5. A circuit as claimed in claim 3 wherein said second and fourth means, in combination, comprises:

a control logic circuit having at least quiescent and set states and adapted to be switched sequentially between its states, and means responsive to the set state of said control logic circuit for connecting an enable signal to said third circuit means.

6. An asynchronous multi-stable state circuit comprising:

a. a gating circuit means responsive to input signals representing first and second stable states and an enabling signal for providing at an output thereof gated output signals corresponding to said input signals when said enabling signal is present, and a third signal when said enabling signal is absent, b. a three state memory means having first, second and third stable states and said gated output signals and a clear signal supplied as inputs thereto, said memory being responsive to said clear signal and said gated output representing said third signal for causing said memory means to assume said third stable state, said memory means being responsive to the absence of said clear signal and the presence of a gated output representing said first or second stable states for causing said memory means to assume said first or second stable states, respectively, and c. a control circuit means connected to the output of said memory means and having a further input applied thereto, and having three states, quiescent, set and clear; said control circuit means being responsive to said memory means being in said third stable state for switching from said quiescent state to said set state and thereby providing an enabling signal to said gating circuit; said control circuit means being responsive to said memory means being in either said first or second stable states for causing said control circuit to switch from said set state to said clear state; and said control circuit means being responsive to said further input for causing said control circuit to switch from said clear state to said quiescent state.

7. A shift register circuit means comprising a plurality of like stages, each said like stages adapted to store only one of three data items $L_1$, $L_0$ and $L_\phi$ and having quiescent, set, and clear control states of operation, each said like stage comprising:

a. means responsive to a clear signal from a succeeding stage of said shift register for storing the data $L_\phi$ in said state, provided said stage is in the quiescent state, b. means responsive to the storage of data $L_\phi$ in said stage for switching the control state of said stage from quiescent to set, c. means responsive to the data stored in a preceding stage of said shift register, provided said data is $L_1$ or $L_0$, for entering said data from said preceding stage into said stage for storage therein when said stage is in the set condition, d. means responsive to the storage of data $L_1$ or $L_0$ in said stage for switching said control state from set to clear control state, e. a means responsive to said control state of said stage for applying a clear signal to said preceding stage, and f. means responsive to said preceding stage storing the data $L_\phi$ for switching the control state of said stage from clear to quiescent.

* * * * *

UNITED STATES PATENT OFFICE

CERTIFICATE OF CORRECTION

PATENT NO. : 3,893,086

DATED : July 1, 1975

INVENTOR(S) : TAKASHI NANYA

It is certified that error appears in the above-identified patent and that said Letters Patent are hereby corrected as shown below:

IN THE SPECIFICATION:

Column 1 - line 7, delete "threestate" and insert --three-state-- line 18, delete "date" and insert --data--

Column 2 - line 35, after "which" insert --is--

Column 4 - line 2, delete "cuases" and insert --causes--

Column 5 - line 59, delete "date" and insert --data--

IN THE CLAIMS:

Column 7 - line 45, after "first" insert --output--

Column 8 - line 62, delete "enable" and insert --enabling--

Column 9 - line 6, after "memory" insert --means--

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*